US010989136B2

(12) United States Patent
Perr et al.

(10) Patent No.: US 10,989,136 B2
(45) Date of Patent: Apr. 27, 2021

(54) PARENT BORE CYLINDER BLOCK OF AN OPPOSED-PISTON ENGINE (71) Applicant: ACHATES POWER, INC., San Diego, CA (US)

(72) Inventors: Andrew P. Perr, Columbus, IN (US); John J. Koszewnik, Colorado Springs, CO (US); Gary A. Vrsek, Howell, MI (US)

(73) Assignee: Achates Power, Inc., San Diego, CA (US)

( * ) Notice: Subject to any disclaimer, the term of this patent is extended or adjusted under 35 U.S.C. 154(b) by 130 days.

(21) Appl. No.: 16/189,129

(22) Filed: Nov. 13, 2018

(65) Prior Publication Data
US 2020/0149493 A1 May 14, 2020

(51) Int. Cl.
F02F 1/10 (2006.01)
F01P 3/02 (2006.01)
F02F 1/14 (2006.01)
B33Y 80/00 (2015.01)
B33Y 10/00 (2015.01)
B28B 1/00 (2006.01)
B22D 29/00 (2006.01)
B22C 9/10 (2006.01)
(Continued)

(52) U.S. Cl.
CPC ............... F02F 1/10 (2013.01); B22C 9/10 (2013.01); B22D 29/002 (2013.01); B28B 1/001 (2013.01); B33Y 10/00 (2014.12); B33Y 80/00 (2014.12); F01P 3/02 (2013.01); F02B 75/28 (2013.01); F02F 1/14 (2013.01); B33Y 70/00 (2014.12); F01P 2003/021 (2013.01); F02F 2200/06 (2013.01)

(58) Field of Classification Search
CPC .......... F01P 3/02; F01P 2003/021; F02F 1/14; F02F 1/186; B33Y 80/00; B33Y 10/00; B33Y 70/00; B28B 1/001; B22D 29/002; F02B 75/28; F01B 7/14
See application file for complete search history.

(56) References Cited

U.S. PATENT DOCUMENTS 2,244,323 A * 6/1941 Antonsen .................. F02F 1/14
123/41.78
2,444,382 A * 6/1948 Steiner .................... F02F 1/186
123/41.79
(Continued)

FOREIGN PATENT DOCUMENTS

WO WO 2017/040403 A1 3/2017
WO WO 2018/175255 A1 9/2018
WO WO 2020/101994 A1 5/2020

OTHER PUBLICATIONS

International Search Report and Written Opinion dated Jan. 10, 2020, for PCT application No. PCT/US2019/060205.

Primary Examiner — Hung Q Nguyen
(74) Attorney, Agent, or Firm — Terrance A. Meador (57) ABSTRACT A parent bore cylinder block of an internal combustion, opposed-piston engine includes cooling passages that are formed using a 3-D printed casting core. The casting core can include portions that are ceramic. The parent bore cylinder block can include multiple cylinders, each cylinder with cooling passages and turbulence inducing features in those cooling passages, particularly surrounding the central portions of the cylinders.

11 Claims, 12 Drawing Sheets (51) Int. Cl.
 *F02B 75/28* (2006.01)
 *B33Y 70/00* (2020.01)

(56) References Cited

U.S. PATENT DOCUMENTS

| | | | | |
|---|---|---|---|---|
| 2,446,841 | A * | 8/1948 | Lieberherr | F02F 1/186 123/41.79 |
| 2,461,853 | A * | 2/1949 | Steiner | F02F 1/186 123/41.79 |
| 2,703,077 | A * | 3/1955 | Antonsen | F02F 1/186 123/193.2 |
| 4,856,463 | A * | 8/1989 | Johnston | F01B 7/14 123/51 BA |
| 5,320,158 | A | 6/1994 | Helgesen | 164/76.1 |
| 5,469,817 | A | 11/1995 | Hoag | 123/41.79 |
| 6,182,619 | B1 | 2/2001 | Spitzer et al. | 123/51 B |
| 8,267,148 | B1 | 9/2012 | Megel et al. | 164/28 |
| 8,485,147 | B2 | 7/2013 | Liu et al. | 123/51 B |
| 9,121,365 | B1 * | 9/2015 | Wagner | F02F 1/004 |
| 9,162,280 | B2 | 10/2015 | Westmoreland et al. | B22C 9/10 |
| 9,328,692 | B2 * | 5/2016 | Rado | F01M 11/02 |
| 9,381,564 | B2 | 7/2016 | McGuire et al. | B22C 1/10 |
| 9,435,290 | B2 | 9/2016 | Fuqua | F02F 7/0009 |
| 9,528,464 | B2 | 12/2016 | Beyer et al. | F02F 1/10 |
| 9,856,818 | B2 | 1/2018 | Quinton et al. | F02F 1/10 |
| 9,896,948 | B2 | 2/2018 | Fulayter et al. | F01D 5/3061 |
| 2012/0138007 | A1 | 6/2012 | Smith et al. | 123/193.5 |
| 2015/0027658 | A1 | 1/2015 | Westmoreland et al. | 164/520 |
| 2016/0356241 | A1 | 12/2016 | Fuqua | F02F 1/14 |
| 2017/0254288 | A1 | 9/2017 | Wagner et al. | F02F 1/24 |
| 2018/0216567 | A1 | 8/2018 | Ferguson | F02F 1/004 |

\* cited by examiner

PARENT BORE CYLINDER BLOCK OF AN OPPOSED-PISTON ENGINE

STATEMENT REGARDING FEDERALLY SPONSORED RESEARCH

This Project Agreement Holder (PAH) invention was made with U.S. Government support under Agreement No. W15KQN-14-9-1002 awarded by the U.S. Army Contracting Command-New Jersey (ACC-NJ) to the National Advanced Mobility Consortium. The Government has certain rights in the invention.

TECHNICAL FIELD

The technical field includes opposed-piston internal combustion engines. More specifically the technical field relates to the construction of a parent bore cylinder block of an opposed-piston engine in which one or more cylinders are cast as an integral unit with a cylinder block. More particularly, the field concerns casting a parent bore cylinder block of an opposed-piston engine using a casting core fabricated by 3-D printing. The field may include use of a core combination including one or more ceramic casting cores with which to form features of the cylinders.

BACKGROUND

In a two-stroke cycle, opposed-piston internal combustion engine, there is at least one ported cylinder with a pair of pistons disposed for counter-moving operation in the cylinder bore. To-and-fro sliding motion of the pistons in the cylinder is guided by the bore.

The pistons reciprocate in mutually opposing directions in the bore, between respective top center (TC) and bottom center (BC) locations. In one stroke, the pistons approach each other to form a combustion chamber between their end surfaces in an intermediate portion of the bore. In a following stroke, the pistons move apart in response to combustion. The combustion chamber in the intermediate portion is defined between the end surfaces of the pistons when the pistons move through their TC locations of the cylinder, with the piston end surfaces and bore surface providing the combustion chamber boundaries. This intermediate portion bears the highest levels of combustion temperature and pressure that occur during engine operation, and the presence of openings for devices such as fuel injectors, valves, and/or sensors in the intermediate portion diminish its strength and make it vulnerable to cracking, particularly through the fuel and valve openings.

In uniflow-scavenged, opposed-piston engines, cylinder construction can include an intake port in the vicinity of a first end of the cylinder and an exhaust port in the vicinity of a second end of the cylinder. Each port may comprise an array of openings, typically arranged along a circumference of the cylinder, with a bridge (also called a "bar") separating adjacent port openings. Because exhaust gases leaving a cylinder are much hotter than incoming air, the temperatures experienced by the exhaust port of a cylinder in an opposed-piston engine are typically greater than those experienced by an intake port of the same cylinder. Thus, areas adjacent to the exhaust port and the bridges in the exhaust port warrant additional cooling measures as compared with areas adjacent the intake port.

Current opposed-piston constructions for cylinders with cooling systems include wet liners with one or more sleeves that guide cooling fluid ("coolant") along an outside surface of the cylinder, as well as machined channels along or through exhaust port bridges through which the coolant flows. Representative cylinder constructions embodying a liner/sleeve assembly are taught in U.S. Pat. No. 8,485,147.

Presently, a cylinder block of an opposed-piston engine is manufactured by casting and machining block portions that are assembled into an integrated support structure with cylinder tunnels in which cylinder liners are held. Typically, such a cylinder block comprises multiple portions which are separated to allow cylinder liners, with sleeves attached, to be inserted into the tunnels. Fluid seals, such as O-rings, are fitted to the liners to confine coolant flow. With the liner/sleeve assemblies and fluid seals in place, the cylinder block portions are joined, typically by means of threaded fasteners. Such a cylinder block construction is taught in U.S. Pat. No. 9,435,290. Manifestly, it is desirable to provide a monolithic cylinder block of an opposed-piston engine formed as a single piece so as to reduce component count, minimize manufacturing steps, and reduce manufacturing costs. These and other desirable objectives are realized by construction of a parent bore cylinder block of an opposed-piston engine that includes cylinders cast in the block with features defining coolant paths that ensure effective thermal management of the cylinders when the engine operates. Parent bore cylinder block constructions do not comprise cylinder liners or cylinder sleeves.

SUMMARY

A parent bore cylinder block of an opposed-piston engine may be made using a 3-D printed casting core for part or all of the cylinder block components, thus minimizing the number of parts and the portions that must be joined while allowing for complex shapes and potentially reducing manufacturing costs. Methods for producing a parent bore cylinder block, as well as for producing the 3-D printed casting core, are also presented. Preferably, the parent bore cylinder block is cast from a single type of metal or metal alloy.

In some implementations, a parent bore cylinder block of an opposed-piston engine includes at least one cylinder with a bore that has a bore surface and a longitudinal axis, an intermediate portion situated between exhaust and intake ports of the cylinder and extending along the longitudinal axis, and a cooling jacket surrounding a combustion zone in the intermediate portion of the cylinder. When used herein, the term "combustion zone" refers to an annular portion of the cylinder where a mixture of fuel and air combusts. A combustion chamber is defined or formed between the end surfaces of the pistons as the pistons move through their TC locations within the combustion zone. Provision is made in the construction of the combustion zone to enable it to withstand the pressure of combustion and to effectively remove heat of combustion that escapes from the combustion chamber.

The following features can be present in a cylinder of the parent bore cylinder block in any suitable combination. The cylinder may include longitudinally separated intake and exhaust ports. The intake and exhaust ports may include port openings positioned respectively in an intake plenum and an exhaust plenum of the parent bore cylinder block. In each port, a port bridge separates each port opening from an adjacent port opening. A cooling passage may be provided through at least one port bridge of the exhaust port. The parent bore cylinder block can be made of a single metal casting in which the port openings are cast features. Other cooling features of the cylinder may include any of pegs, walls, ridges, ribs, and other protrusions from an outer wall of the cylinder. These cooling features can be configured to create a coolant flow path for cooling fluid. Spacing between the cooling features can range from 1.5 mm to 10 mm, such as about 5 mm. The parent bore cylinder block can further include one or more machined features. In some implementations, the parent bore cylinder block may include an intake gas plenum chamber into which all the intake port openings of a cylinder open from the interior of the cylinder and an exhaust gas plenum chamber into which all the exhaust port openings of a cylinder open from the interior of the cylinder. In some implementations, a parent bore cylinder block for an opposed-piston internal combustion engine may include multiple cylinders.

In related aspects, an opposed-piston engine includes a parent bore cylinder block which is cast from a single type of metal or metal alloy. The parent bore cylinder block includes at least one cylinder with a cylinder bore, a bore surface, and a longitudinal axis. A combustion zone of the cylinder block is located an intermediate portion of the at least one cylinder, along the longitudinal axis of the cylinder bore. The parent bore cylinder block includes a cooling jacket surrounding the combustion zone. Cooling features of the cylinder are enclosed by the cooling jacket. An intake port of the cylinder is longitudinally separated from an exhaust port of the cylinder. The intake port includes openings in the parent bore cylinder block to an intake plenum of the parent bore cylinder block and the exhaust port includes openings in the parent bore cylinder block to an exhaust plenum of the parent bore cylinder block.

In another related aspect, a method of making a parent bore cylinder block of an opposed-piston engine is described herein. The method includes making a casting core for a parent bore cylinder block, creating a molding assembly for the parent bore cylinder block using the casting core, casting metal into the molding assembly, and, once the metal parent bore cylinder block is ready, removing the molding assembly. The method can apply to a parent bore cylinder block for an opposed-piston, two-stroke, uniflow-scavenged internal combustion engine.

Making a casting core for the method may include using a 3-D printing technique. In the method, the casting core can include a ceramic core portion and one or more sand core components. Removing the molding assembly in the method can include using caustic or an acid to dissolve the ceramic core portion. In some implementations of the method, the ceramic core portion of the casting core can include features near an intermediate portion of the cylinder that form cooling channels in the metal cylinder block.

DETAILED DESCRIPTION

The parent bore cylinder blocks described and illustrated herein provide improved opposed-piston engines. Other aspects include engine embodiments for opposed-piston engines which are possible through use of the novel means and methods of fabrication described below.

Figure 1:
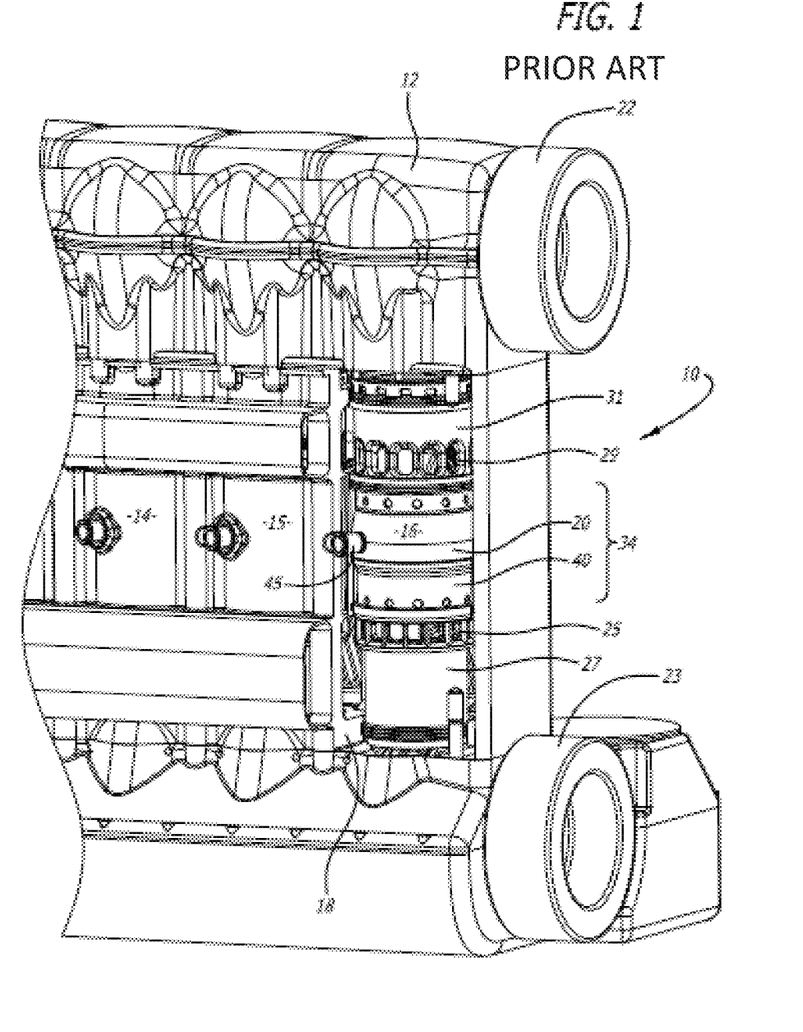
FIG. 1 shows a portion of an opposed-piston engine, partially cut away to show a cylinder, and is properly labeled "PRIOR ART".

FIG. 1 shows a prior-art opposed-piston engine 10 with a cylinder block 12 with three identically-constructed cylinders 14, 15, and 16. A portion of the cylinder block 12 is removed to show the construction of the cylinder 16 which includes a cylinder tunnel 18 formed in the block in which a cylinder liner 20 is supported. The engine 10 includes two crankshafts 22 and 23. The cylinder liner 20 includes an intake port 25 near a first liner end 27, exhaust port 29 near a second liner end 31, and an intermediate portion 34 situated between the intake and exhaust ports. The intake port 25 and exhaust port 29 open into an intake plenum and exhaust plenum, respectively. The exhaust plenum may be an exhaust chamber that receives all the exhaust gas from the exhaust ports of all of the cylinders in the cylinder block.

Figure 2:
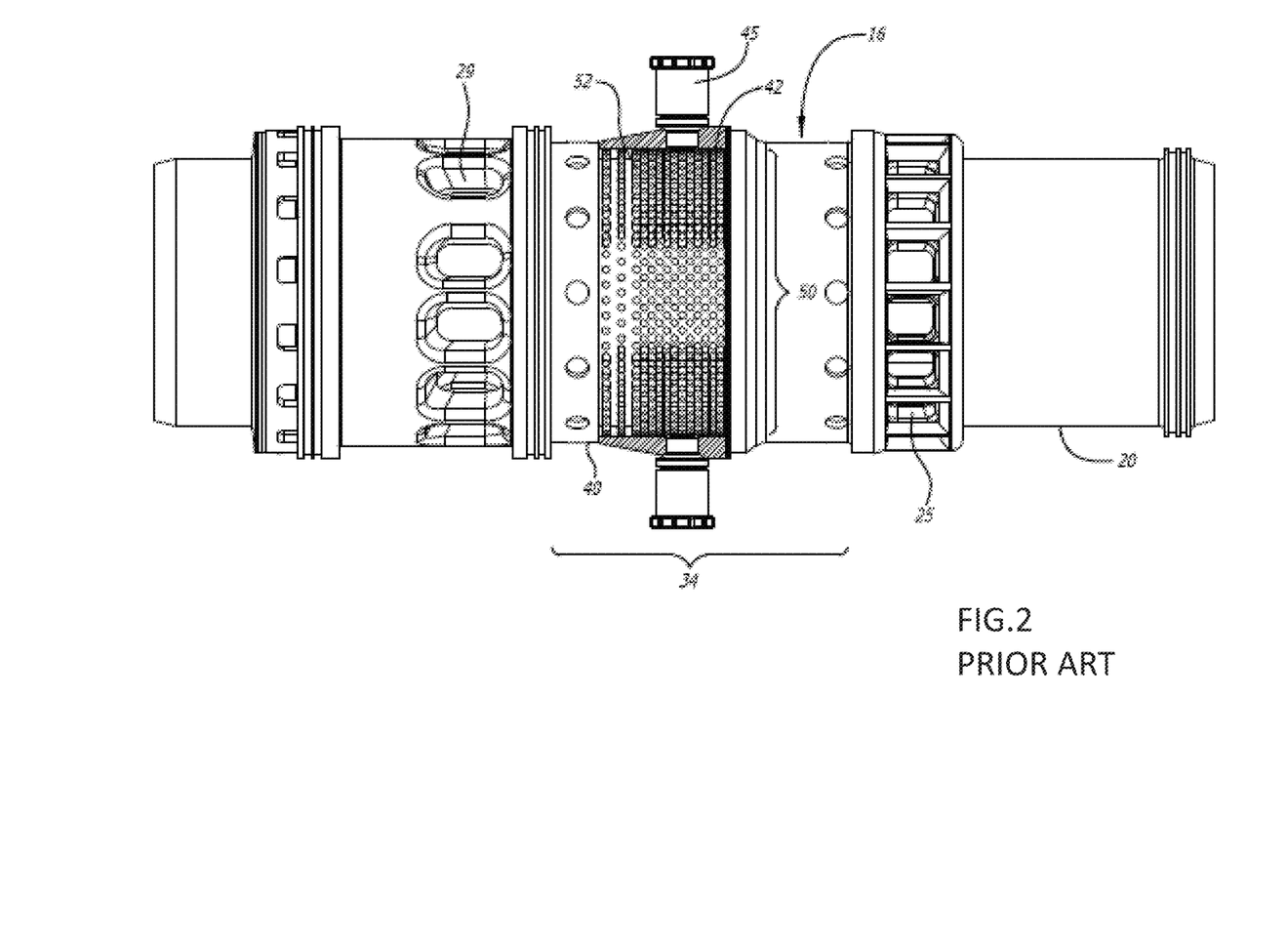
FIG. 2 is a side elevational view of a cylinder liner assembly of the opposed-piston engine of FIG. 1, with a portion of a sleeve cut away from a liner, and is properly labeled "PRIOR ART".
Figure 3A:
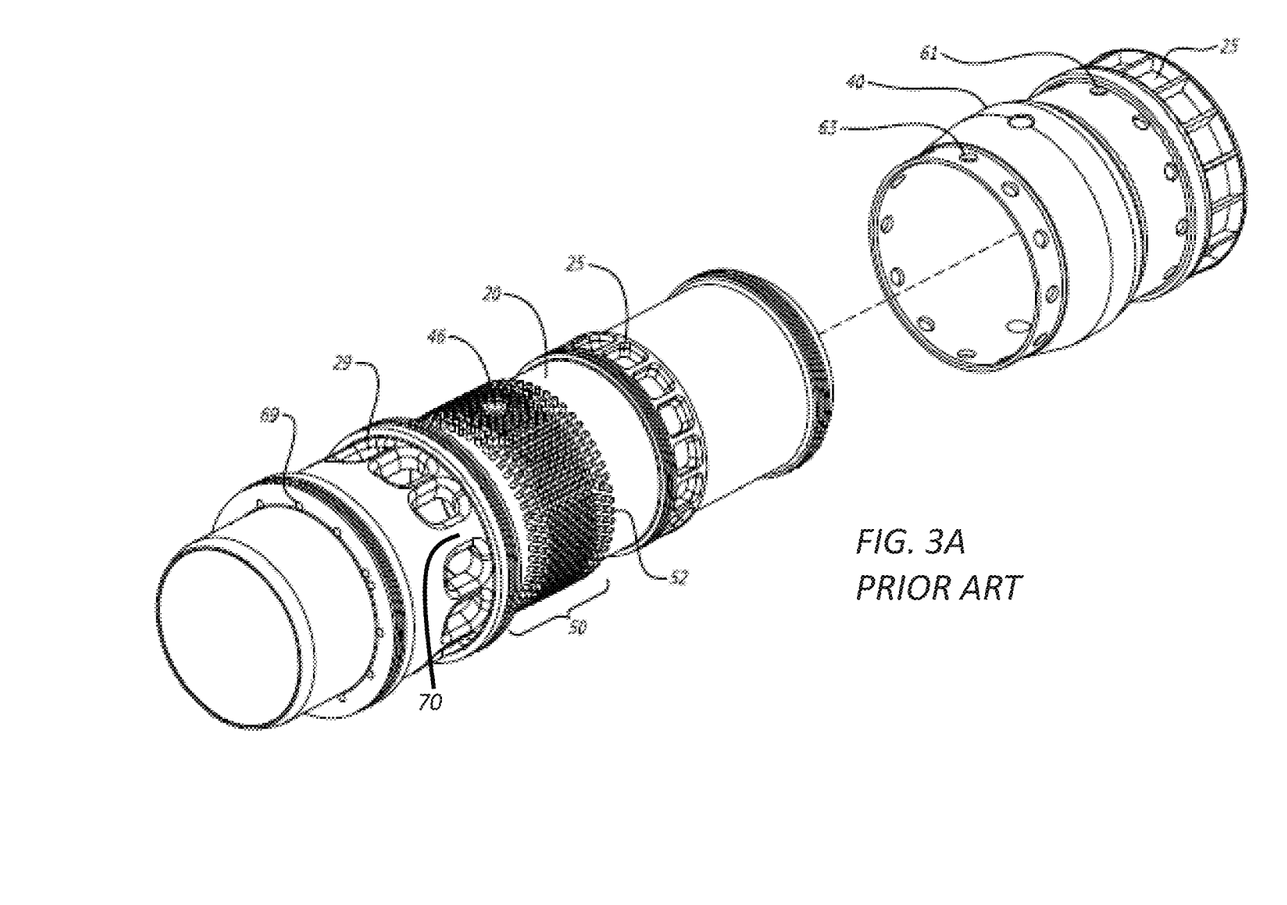
FIG. 3A is an exploded view of the cylinder liner assembly of FIG. 2 showing sleeve and liner separated, and is properly labeled "PRIOR ART".
Figure 3B:
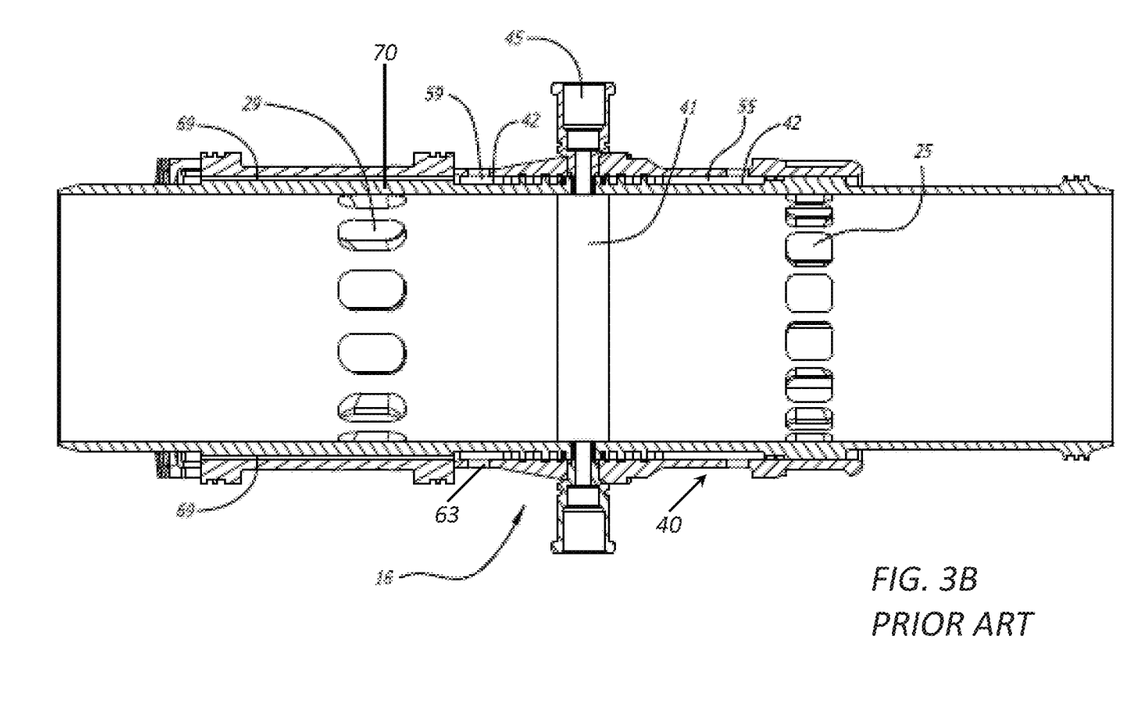
FIG. 3B is a cross-sectional view of the cylinder liner assembly of FIG. 2, and is properly labeled "PRIOR ART".

FIGS. 2, 3A, and 3B illustrate a prior art cylinder structure for opposed-piston engines that includes a liner with a bore and longitudinally displaced intake and exhaust ports near respective ends thereof. As per FIGS. 1 and 3A, a compression sleeve 40 is received over the liner 20. A fuel injector 45 is supported in a boss 46 through the sidewall of the cylinder for direct injection of fuel into the combustion chamber.

FIGS. 2, 3A, and 3B, show details of the structure of the prior art cylinder 16 which includes the liner 20 with the compression sleeve 40 closely encircling and reinforcing the portion of the liner 20 that extends from the intake port 25 to the intermediate portion 34. As seen in FIG. 2 and FIG. 3B, the intermediate portion 34 contains a top ring reversal zone 41 where a combustion chamber is formed when the end surfaces of the pair of pistons disposed in opposition in the bore are in close mutual proximity. The compression sleeve 40 is formed to define a generally annular jacket between itself and the external surface 42 of the liner through which a liquid coolant may flow in an axial direction from near the intake port toward the exhaust port. The strength of the intermediate portion 34 is reinforced by an annular grid 50 of pegs 52 that extend between the intermediate portion 34 and the compression sleeve 40. The grid 50 closely encircles the intermediate portion 34, which is subjected to the high pressures and temperatures of combustion. The pegs 52 support the liner intermediate portion 34 against the compression sleeve 40. The grid 50 also defines an annular turbulent liquid coolant flow path extending across the intermediate portion 34.

A generally annular space 55 is formed between the external surface 42 of the liner and the compression sleeve 40. This space surrounds the side of the liner intermediate portion 34 that is nearest the intake port 25. Another generally annular space 59 is formed between the external surface 42 of the liner and the compression sleeve 40. This space abuts the side of the liner intermediate portion 34 that is nearest the exhaust port 29. These spaces 55 and 59 are in fluid communication with each other via a coolant flow path defined by the grid 50. One or more coolant entry ports 61 formed in the compression sleeve 40 are positioned over and in fluid communication with the annular space 55 and one or more coolant exit ports 63 formed in the compression sleeve are positioned over and in fluid communication with the annular space 59.

As per FIGS. 2 and 3A, the grid pegs 52 may be provided in enough density to closely surround and reinforce those sectors of the intermediate portion where bosses 46 locate and support injector nozzles, valves, and the like. Advantageously, the maze of interstices among the grid pegs 52 affords access of liquid coolant to the entirety of the outside surface of each boss 46 and to the external surface area of the liner immediately adjacent to the boss.

During operation of the opposed-piston engine 10, the cylinder 16 is cooled by introducing a liquid coolant (such as a water-based mixture) into the jacket defined between the compression sleeve 40 and the external surface 42 of the liner. The coolant is pumped through a coolant channel in the cylinder block 12 that is in fluid communication with the annular space 55. The pumped coolant enters the annular space 55 via the coolant entry ports 61, which causes the coolant to flow on the external surface 42, along the intermediate portion 34 of the liner 20. The pump pressure causes the liquid coolant to flow through the grid 50 wherein the pegs 52 act as an annular maze of turbulators (devices that turn laminar flow into turbulent flow) that encircles the intermediate portion 34 and generates turbulent flow of the coolant across the intermediate portion. The turbulent flow increases the heat transfer efficiency into the liquid coolant flowing over the intermediate portion 34. The pressure of coolant flowing through the grid 50 causes the liquid coolant to flow from the intermediate portion 34 toward the exhaust port 29 and into the annular space 59. From the annular space 59, the coolant flows to and through a return channel formed in the cylinder block 12. In some instances, coolant may be routed from the annular space 59 through channels 69 (e.g., cooling passage) that pass on, over, or through the exhaust port bridges 70.

Prior art cylinder liners, such as those shown in FIGS. 2, 3A, and 3B, can be made using conventional casting and/or machining techniques. A conventional casting process may include creating a core of sand and a binder, such as an organic material (e.g., vegetable oil, cereal), a thermoset polymer, a low-melting temperature metal or alloy, clay, or an inorganic binder that sets upon contact with a specific gas or with air. An example of a binder that sets upon contact with a specific gas is sodium silicate, which hardens after exposure to carbon dioxide. Conventional materials can be used to form the outer portion of a mold for casting cylinder liners and cylinder block portions. Portions of a cylinder liner or block can be cast as individual parts that are later joined using known techniques or means to ultimately assemble a cylinder liner and/or an engine block.

Casting A Parent Bore Cylinder Block: A parent bore cylinder block of an opposed-piston engine may be cast as a single metal piece from a mold that includes a 3-D printed casting core. A single-piece, monolithic, or unitary, parent bore cylinder block can be advantageous over cylinder blocks that are fabricated from many pieces fitted together because of fewer junctions and connective parts needed (e.g., O-rings). In contrast to conventional casting techniques which may not be able to create the desired turbulators (e.g., turbulent flow creating features), creating a 3-D printed casting core, particularly a casting core that uses ceramic in some portions, can allow for the needed feature size and texture.

Casting cores that are created using 3-D printing techniques are particularly suited to the creation of parent bore cylinder blocks as described herein. The complexity of the arrays of turbulators, as well as the structures surrounding the intermediate section and exhaust port of each cylinder (e.g., compression sleeve, cooling water supply and exit conduits, port bridge cooling passages) are more suitably formed using 3-D printing techniques. Casting cores made using 3-D printing techniques are built up one layer at a time from a computer-aided design file (CAD file) that is divided into slices. Each slice is composed of a layer of solid material (e.g., sand or ceramic) and an overlaid layer of binder. The assembled slices create the completed form. In the case of casting cores that are ceramic or that have ceramic portions, excess powder is removed from the ceramic body while it is not yet set, before firing in a kiln or furnace. The malleable ceramic body can be fired before being used as part of the greater casting mold that consists of at least one shell and core components. If the ceramic body in the unfired state is strong enough, it can be used as a core or core component after forming. The casting mold shapes molten metal as it cools after being poured. In some implementations, the mold can be spun while the metal cools to influence the materials properties of the finished metal product. 3-D printing techniques can be used to create casting cores that are sand cores or hybrid cores. Hybrid cores utilize sand for larger dimensioned volumes and ceramic for portions of the core with finer features.

A hybrid core comprising sand and ceramic portions, as opposed to an entirely sand core, may be better suited to the formation of a core for a cylinder with an intermediate section, as described above, with an interior surface of the parent bore cylinder block in place of a compression sleeve defining an annular cooling jacket with an array of turbulence-inducing features through which liquid coolant (e.g., water) flows when the cylinder is used in an opposed-piston engine. A hybrid core is beneficial when creating a parent bore cylinder block because a portion of the hybrid casting core can be made of ceramic (i.e., ceramic core portion) and finer features can be created. The nature of a ceramic core makes it more durable than a sand core, so structures with smaller features, or those spaced more closely together, can be formed with better dimensional stability, ensuring that a part will have dimensions closer to those that are intended. With entirely sand cores, there is a greater risk that fine features will break once molten metal is introduced into the mold, or that the core will erode during that process. Additionally, with entirely sand cores, the cast metal parts can have a surface texturing that reflects the sand particles or that includes some embedded sand particles left after the core is removed from the cast part. In areas where there is little clearance between adjacent features or where surface texturing can negatively affect fluid flow, such texturing or surface inclusions can be undesirable. Because ceramic casting cores (or portions of a casting core that are ceramic) are eventually removed by leeching with a caustic or acid, the surface of the cast part is more likely to have a smooth surface that does not need aggressive post-molding processing.

Figure 4A:
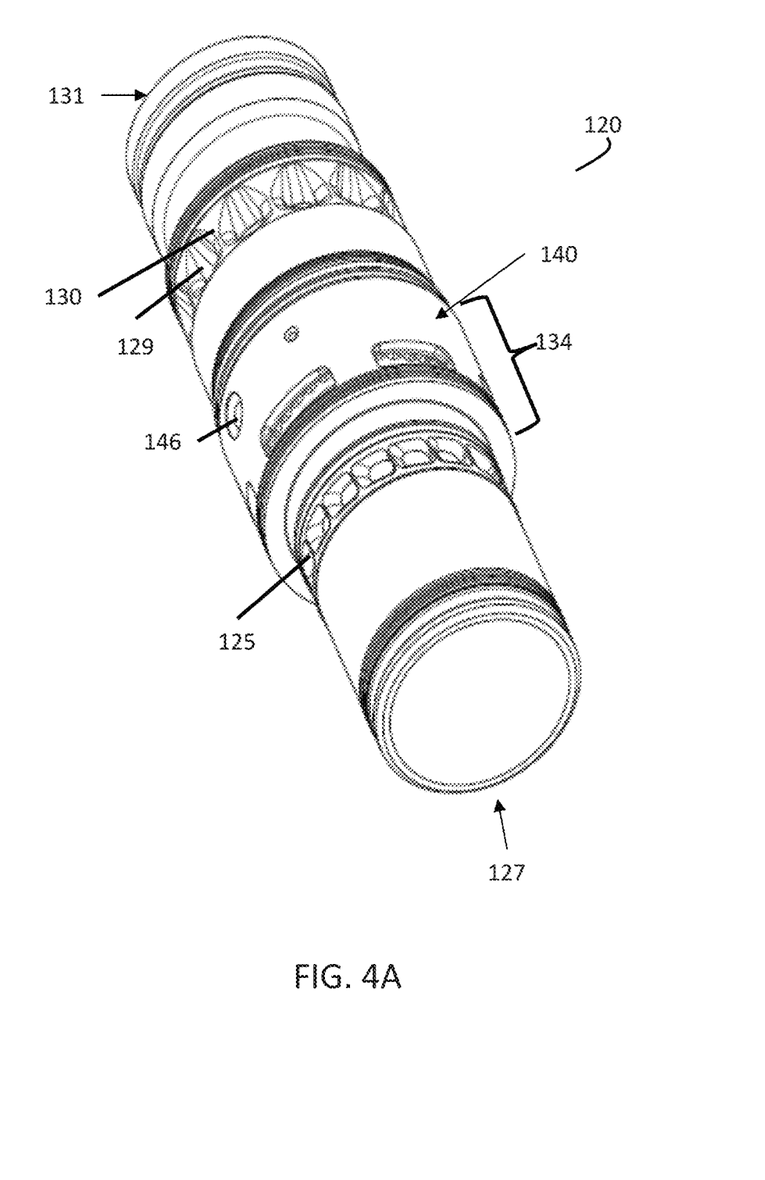
FIG. 4A shows an exemplary cylinder construction for an opposed-piston engine that is made using a 3-D printed casting core.
Figure 4B:
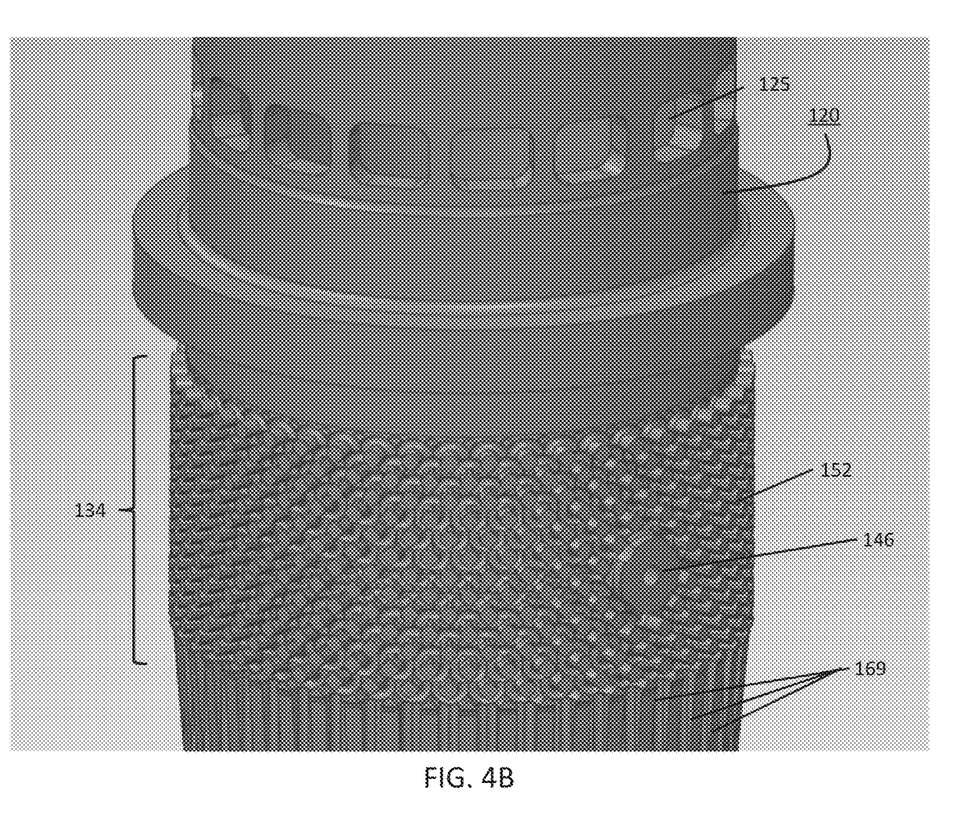
FIG. 4B is a view of part of the cylinder of FIG. 4A showing certain cooling features.
Figure 4C:
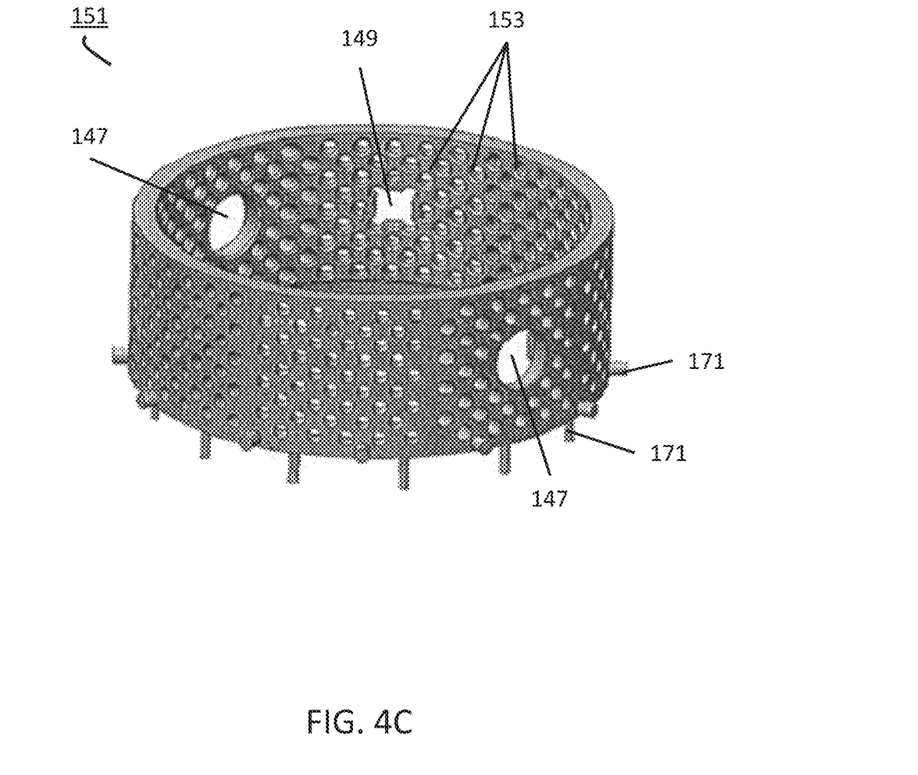
FIG. 4C is a view of a casting core portion that shapes some of the cooling features.

Cylinder: FIG. 4A shows an exemplary cylinder construction for a parent bore cylinder block of an opposed-piston engine that is made using a 3-D printed casting core with a ceramic portion to create cooling features around the middle section of the cylinder. FIG. 4B shows a portion of a cylinder with certain cooling features visible in greater detail. FIG. 4C shows a 3-D printed casting core which may be used to fabricate certain features of the cylinder shown in FIG. 4A. The cylinder 120 includes an inlet port that is made up of one or more arrays of inlet port openings 125 through the sidewall of the cylinder arranged along a circumference of the cylinder near a first cylinder end 127 (e.g., intake end). An exhaust port includes one or more arrays of exhaust port openings 129 that are separated by bridges 130 and that extend through the sidewall of the cylinder. As per FIGS. 4A and 4B, the exhaust port openings 129 are arranged along a circumference of the cylinder near a second cylinder end 131 (e.g., exhaust end). An intermediate portion 134 in a midsection of the cylinder 120 lies between the intake 125 and exhaust port ports. During operation of an engine, when the pistons are closest to each other, a combustion chamber into which fuel is injected through fuel injection ports 146 is defined in the intermediate portion 134, between the adjacent end surfaces of the pistons.

The intermediate portion 134 of the cylinder contains the combustion zone of the cylinder. A cooling jacket wall 140 (corresponding to the compression ring 40 in FIGS. 3A and 3B) is shown encircling the intermediate portion 134 of the cylinder. The cooling jacket wall 140 is integral to the parent bore cylinder block. In the jacket space defined between the cooling jacket wall 140 and the intermediate portion of the cylinder wall are features that create turbulence in flowing liquid coolant, shown here as cylindrical pegs. Also visible in FIG. 4A are portions of the exhaust port bridge cooling channels 169. These cooling channels 169 can also be fabricated by 3-D printed casting cores for the channels that are used when creating the molding assembly for the parent bore cylinder block.

The port bridges 130 separate the openings that make up the exhaust port, and cooling channels 169 can be present in each port bridge, between each pair of adjacent port openings, or present less frequently, for example in every second port bridge. Further, though the cooling channels 169 are described as being in port bridges, cooling channels can be formed as passages through, over, or on bridges, as well as fluid transporting cuts adjacent to bridges formed in the cylinder cooling jacket wall, and the like. 3-D printed casting cores can accommodate any of these configurations, including combinations of passages through and adjacent to bridges.

The use of a 3-D printed casting core to form the intermediate portion 134 of the cylinder 120 enables the formation of fine-pitched features for guiding coolant around the cylinder hot-spots in the combustion zone.

In cylinders where the intermediate portion 134 includes features with dimensions or separations on the order of 1 to 10 mm, the casting core can be one with ceramic material, instead of sand, in all or part of the intermediate portion 134. Used herein, features are structures, distinctive attributes or aspects of the described cylinders and casting cores. The features on the intermediate portion 134 of a cylinder can include cooling features, such as turbulators and passages (e.g., conduits) for transporting cooling fluid.

In FIG. 4B, an annular array of pegs 152 through which coolant flows during engine operation can be seen, as well as openings 169 to the cooling channels that pass through the port bridges on the exhaust side of the cylinder 120. During engine operation, coolant flows around the pegs 152, as well as through the cooling channels. In FIG. 4C the casting core portion 151 that shapes the pegs 152 can be seen independent of the cylinder 120. The casting core portion 151 is shown having two openings 147 that accommodate fuel injection nozzles (e.g., fuel injection boss 146 in FIG. 4B), an opening 149 to accommodate a valve for a compression-release braking system or a sensor for a combustion control mechanization, and openings 153 that shape molten metal into cylindrical pegs to create turbulent coolant flow of liquid coolant along and around the intermediate portion 134 of the cylinder 120 (e.g., pegs 152 in FIG. 4B), as well as features 171 that allow for the connection of this core segment 151 to other portions of a casting core or casting mold for a parent bore cylinder block. This casting core portion or segment 151 can be 3-D printed and may be made using a ceramic material instead of the relatively coarser sand used in conventional casting core fabrication.

Figure 5A:
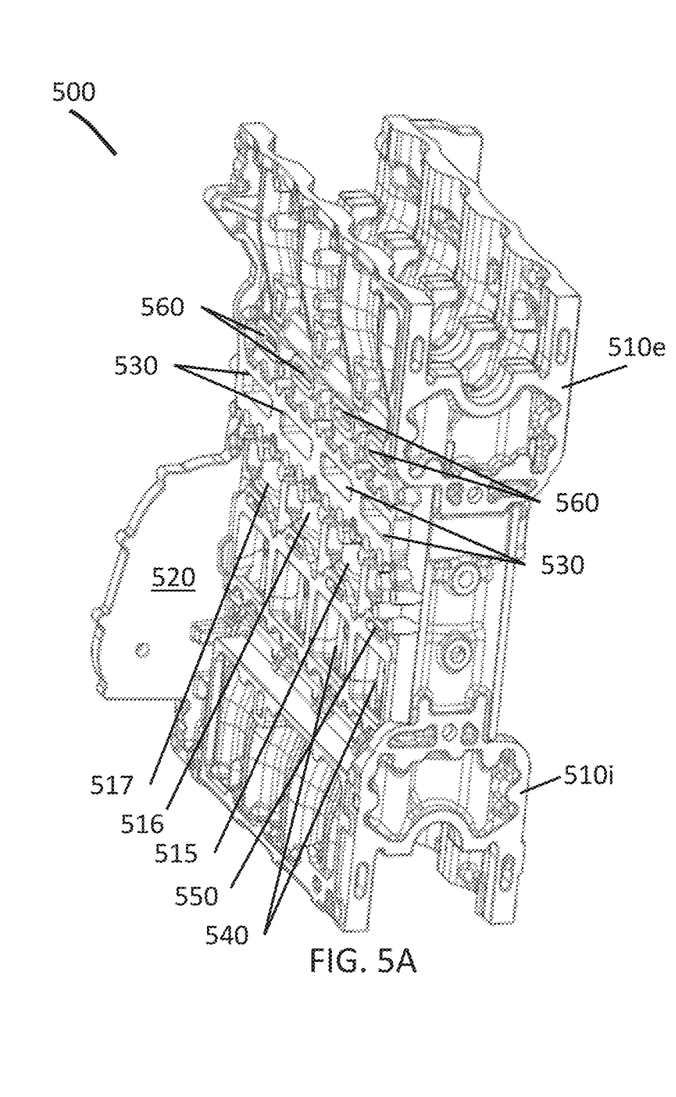
FIGS. 5A and 5B show views of a parent bore cylinder block with multiple opposed-piston engine cylinders with cooling features.
Figure 5B:
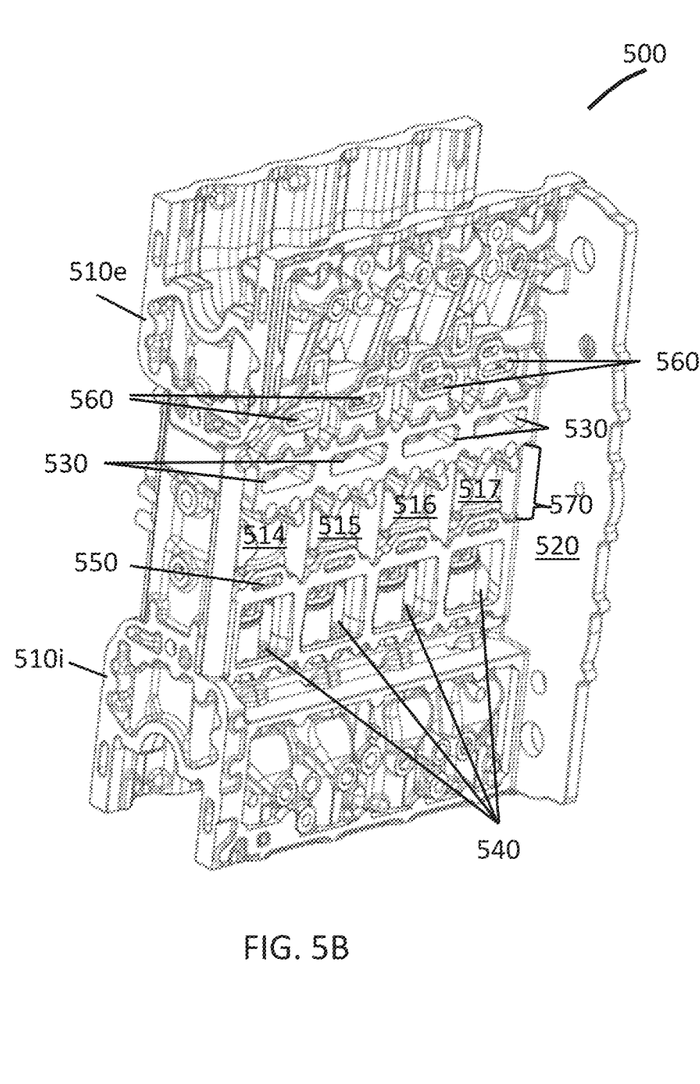

Parent Bore Cylinder Block: FIGS. 5A and 5B show views of a parent bore cylinder block 500 with multiple opposed-piston engine cylinders 514, 515, 516, 517 with cooling features according to FIGS. 4A and 4B. FIG. 5A shows a first side of the parent bore cylinder block 500 and FIG. 5B is the reverse side elevational view. The parent bore cylinder block 500 includes crank case portions 510, one 510i that supports the intake side crank shaft and one 510e that supports the exhaust side crank shaft, as well as portions of the gear train housing 520. Between the crank case portions 510i, 510e, are shown four cylinders 514, 515, 516, 517, each cylinder having an intermediate portion 570 (i.e. combustion zone) which includes the top center position of each of the opposing pistons within the cylinders. Also visible in the parent bore cylinder block 500 shown in FIGS. 5A and 5B are portions of an exhaust plenum 530, portions of an intake plenum 540, openings into the cooling channels 550 on the intake side of the cylinder block 500, and openings into the cooling channels 560 on the exhaust side of the cylinder block 500. In operation, to cool hot spots on the parent bore cylinder block 500, cooling fluid flows through the intake side openings into the cooling channels 550, to an array of turbulators in the intermediate portions 570 of the cylinders 514, 515, 516, 517, over or through port bridges, and then out through the exhaust side openings 560.

Figure 5C:
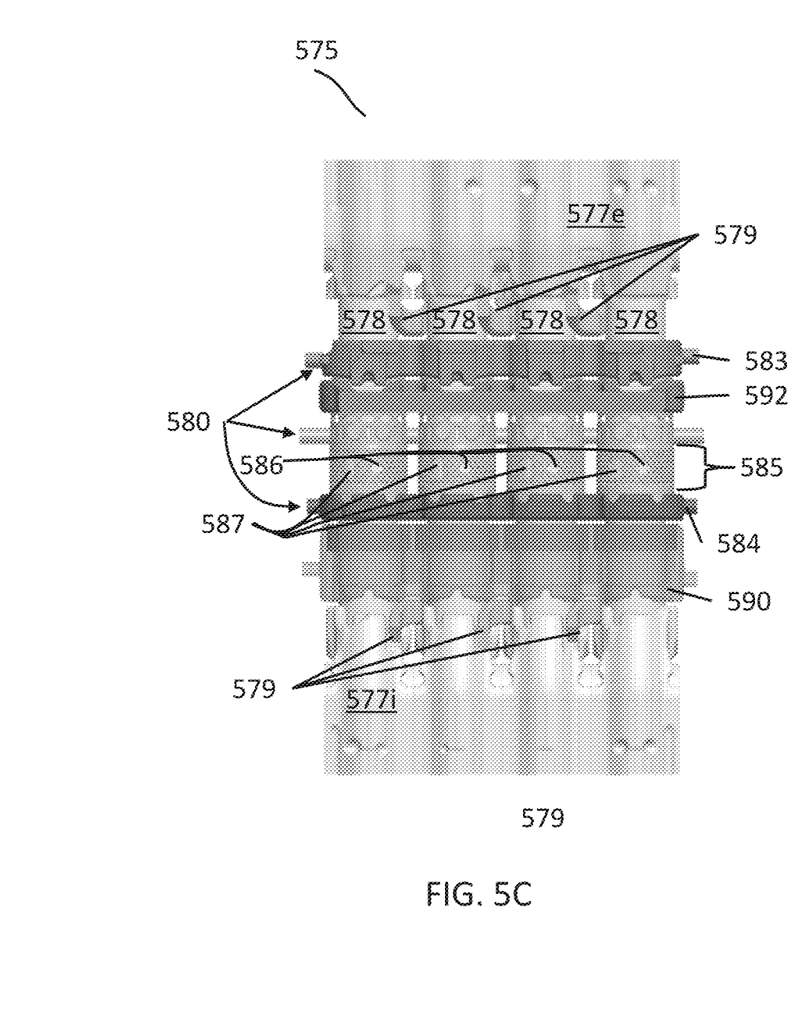
FIGS. 5C and 5D show a casting core for the parent bore cylinder block of FIGS. 5A and 5B.
Figure 5D:
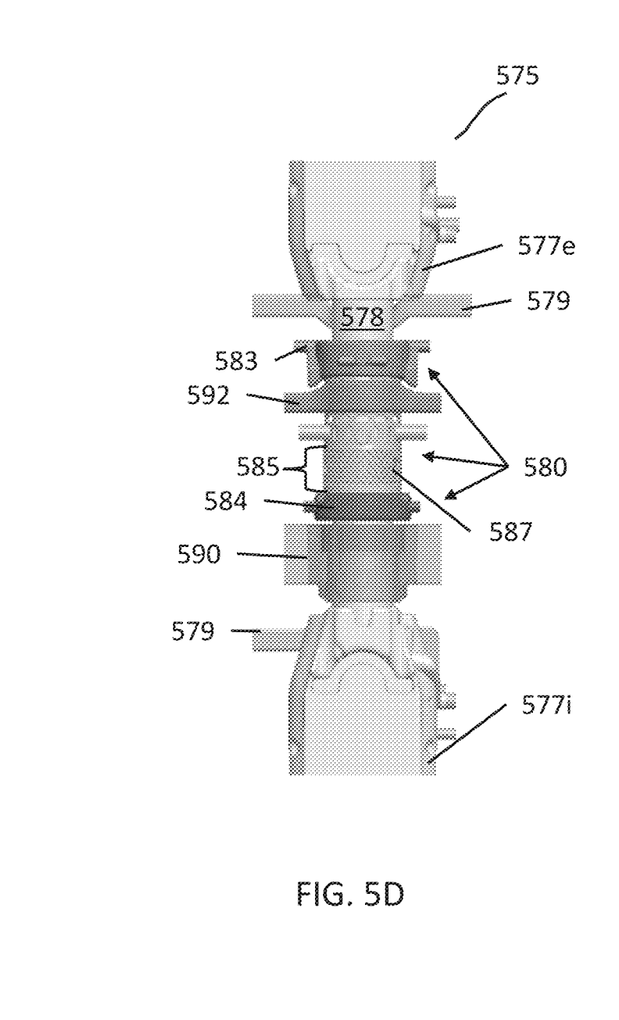
Figure 5E:
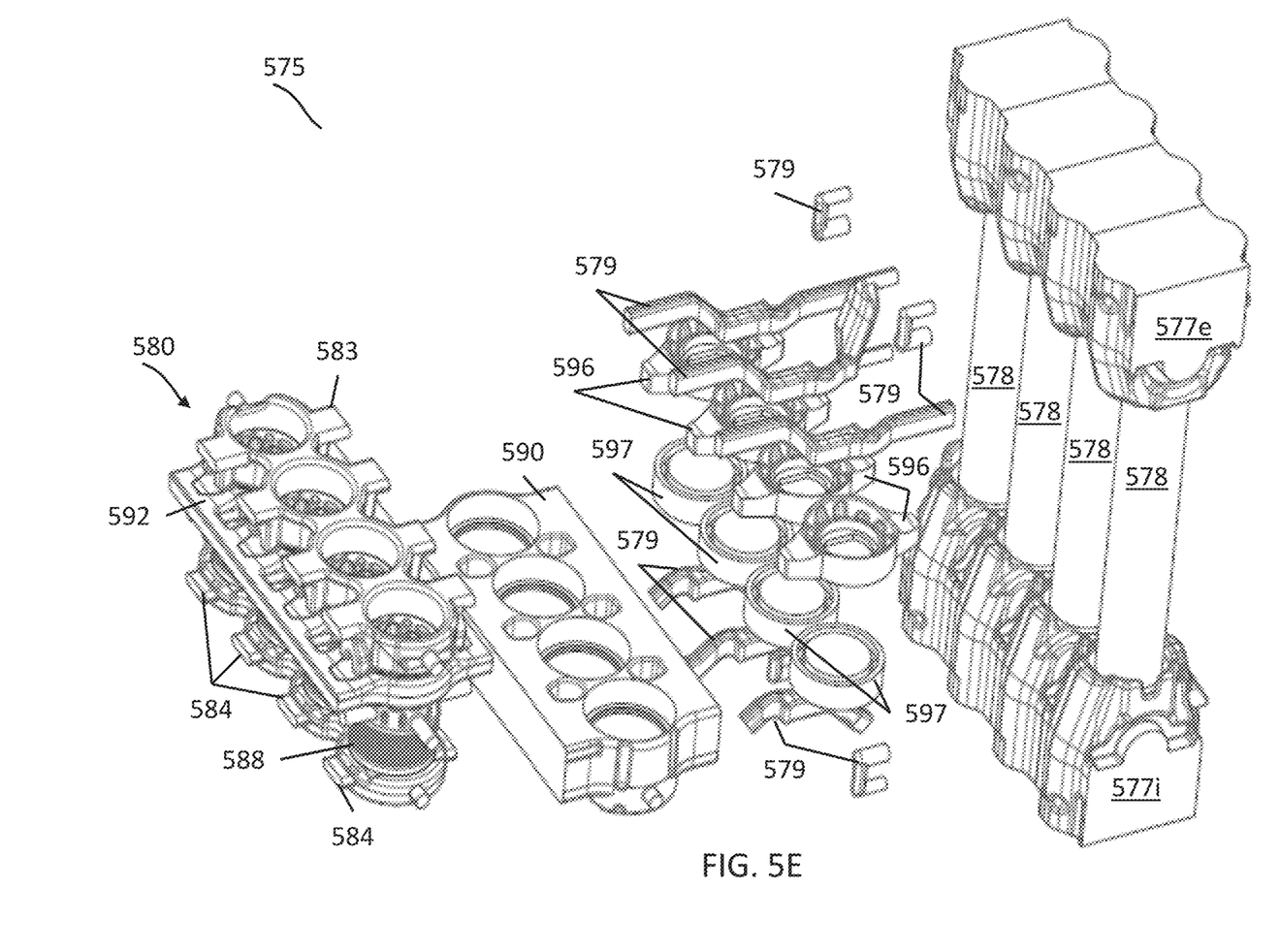
FIG. 5E is an exploded view of the casting core shown in FIGS. 5C and 5D.

The 3-D printed casting core assembly 575 shown in FIGS. 5C-5E allows for the formation of four cylinders 514, 515, 516, 517, each cylinder with a bore, cooling features outside the bore around hot-spots (e.g., the combustion zone, adjacent to exhaust port), and a cooling jacket surrounding the cooling features, allowing for the flow of coolant around the cylinder hot-spots, optimally in a turbulent manner that efficiently removes heat. Each cylinder also has intake and exhaust ports formed by the 3-D printed casting core. The use of a 3-D printed core for forming the cylinders in a parent bore cylinder block allows for precise alignment of ports and cooling features, feature size control, and a surface roughness that allows for use of the resulting casting as-is, without further machining, in some implementations. That is to say, port openings, cooling features, and cooling fluid passages can be cast features (i.e. structures that are cast into finished or near-finished form) in a parent bore cylinder block made using a 3-D printed core, particularly one with one or more ceramic portions such as seen in FIG. 4C in areas where the dimensions for features or passages are relatively fine (e.g., 1 to 10 mm). A single type of metal or metal alloy can be cast into a multi-cylinder block using a 3-D printed casting core.

The ability to create a multi-cylinder parent bore block using a single 3-D printed core has many potential advantages, some further discussed here. A multi-cylinder parent bore block can have the advantage of aligned air handling and coolant transporting features. The aligned features can include exhaust and intake ports, cooling channels adjacent to and between the ports (e.g., across the port bridges), and cooling features around the intermediate portion of each cylinder. Another advantage of using a single 3-D printed core to create a cylinder block can include improved sealing and fewer leaks. Additionally, uniformity of the component walls (e.g., cylinder walls, turbulence features, conduits) can be better controlled using 3-D printed casting cores.

FIGS. 5C and 5D show a casting core assembly 575 for the parent bore cylinder block 500 of FIGS. 5A and 5B. FIG. 5C is an elevation view showing the casting cores for all four of the cylinders in the parent bore cylinder block 500. FIG. 5D is a side elevation view of the casting core assembly 575. The casting core assembly 575 includes crank case portion cores for the intake side 577i and the exhaust side 577e of the cylinder block, cylinder barrel (e.g., cylinder bore) cores 578, cores for oil cavities 579 on both the intake and exhaust sides of the cylinder block, and cores for a cooling assembly 580. The cooling assembly cores 580 include exhaust side cooling channels 583, intake side cooling channels 584, and cores for cooling features 585 that surround the intermediate portion of each cylinder. In the cooling features cores 585 are openings in each turbulator array for fuel injectors 586, as well as additional openings 587 for compression braking valves, pressure sensors, and the like. Cores for the intake air plenum 590 and the exhaust gas plenum 592 are also shown in FIGS. 5C and 5D.

Figure 5F:
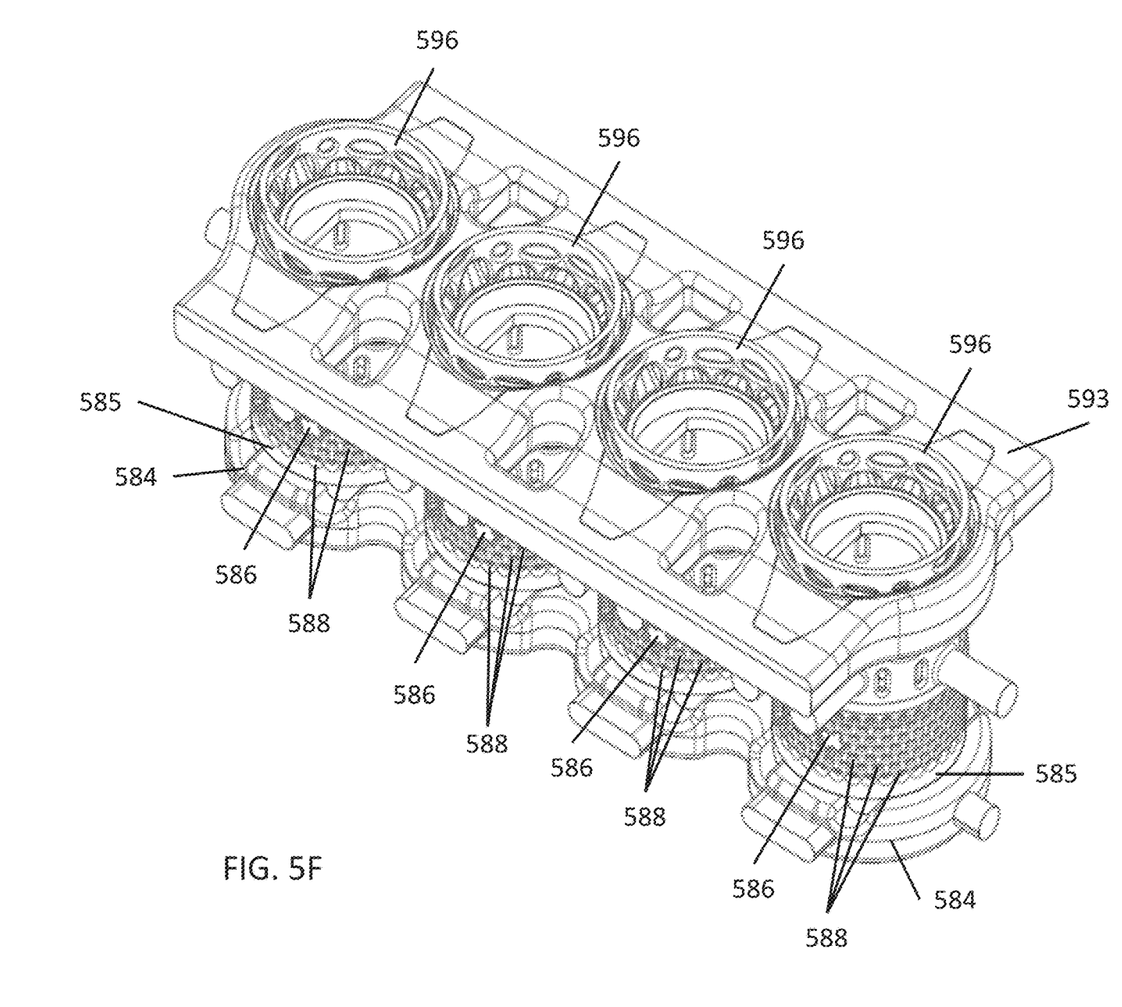
FIG. 5F shows the casting core for certain cooling features of the parent bore cylinder block shown in FIGS. 5A and 5B.

FIG. 5E is an exploded view of the casting core assembly 575 shown in FIGS. 5C and 5D. In addition to cores for the crank case portions 577i, 577e and cylinder barrel 578, cores for the oil cavities 579, intake air plenum 590, and cooling assembly 580 can be seen more completely in FIG. 5E. Additionally, the cores for exhaust ports 596 and for intake ports 597 are shown. As in FIGS. 5C and 5D, the cooling assembly 580 includes exhaust side cooling channels 583, intake side cooling channels 584, and cores to form turbulence-inducing features on the intermediate portion of each cylinder. FIG. 5E shows the exhaust gas plenum core 592 with the cooling assembly 580, FIG. 5F shows the casting core for the cooling features of the parent bore cylinder block shown in FIGS. 5A and 5B. The exhaust gas plenum core 593 and the exhaust port cores 596 are also shown in FIG. 5F. Below the exhaust gas plenum core 593 are the core portions 585 for the intermediate portion of each cylinder. These core portions 585 include holes for forming cylindrical turbulators 588 in arrays and breaks in the turbulator arrays for fuel injectors 586. With the outer part of a casting or molding assembly, the casting core shown in FIG. 5F can form a cooling jacket with turbulators between an outer wall of the cooling jacket and an outer surface of a cylinder in an intermediate portion of the cylinder. As described above, the features (e.g., distinctive structures, holes or orifices that form turbulators, tubes or ruts that form conduits, channels, joints) of the casting core in FIG. 5F can be made using 3-D printing of ceramics, sand, or a combination of both ceramic materials and sand to achieve the required sizes and surface conditions.

Features described throughout this specification are structures that are prominent or distinctive attributes, or aspects, of a parent bore cylinder block or a casting core. These features may be specified in terms of their size, purpose, location, or mode of fabrication (i.e., 3-D printing, casting, machining). Features of casting cores are used to create complementary features in a cast metal product, and so a small feature with a fine pitch between rows of features in a cast metal product (e.g., cylinder block) necessitates a casting core with small complementary features, including holes to make pegs, or columns and walls to make holes and channels. Though cooling features that create turbulence are described herein as cylindrical pegs, cooling features can include any of pegs, walls, ridges, ribs, and other protrusions from an outer wall of a cylinder. The cooling features can be configured to create a coolant flow path for cooling fluid. The shape of the cooling features can vary, including being a combination of shapes. Some of the shapes that could be used for cooling features include cylindrical pegs, pegs with any of the following cross-sections: oval, ellipse, crescent, triangle, quatrefoil, parallelogram, square, rectangle, trapezoid, trapezium, kite, rhombus, pentagon, hexagon, heptagon, octagon, nonagon, decagon, or a compound shape (i.e., a composite shape that is two or more simple shapes combined). Further, the coolant flow path may comprise other configurations than the turbulent flow path. For example, instead of pegs, ridges or lands may be formed to define elongate, spiral, helical, wavy, or rectilinear flow paths. The use of 3-D printed casting cores, including those with ceramic core portions, for parent bore cylinder blocks as described above allows for finer spacing between cooling features. In some implementations, spacing between cooling features can be between 1.5 mm to 10.0 mm, such as about 5 mm. The parent bore cylinder block described herein can have all as-cast features, or it can include as-cast features and machined features, particularly in and around the cylinder bore.

Figure 6:
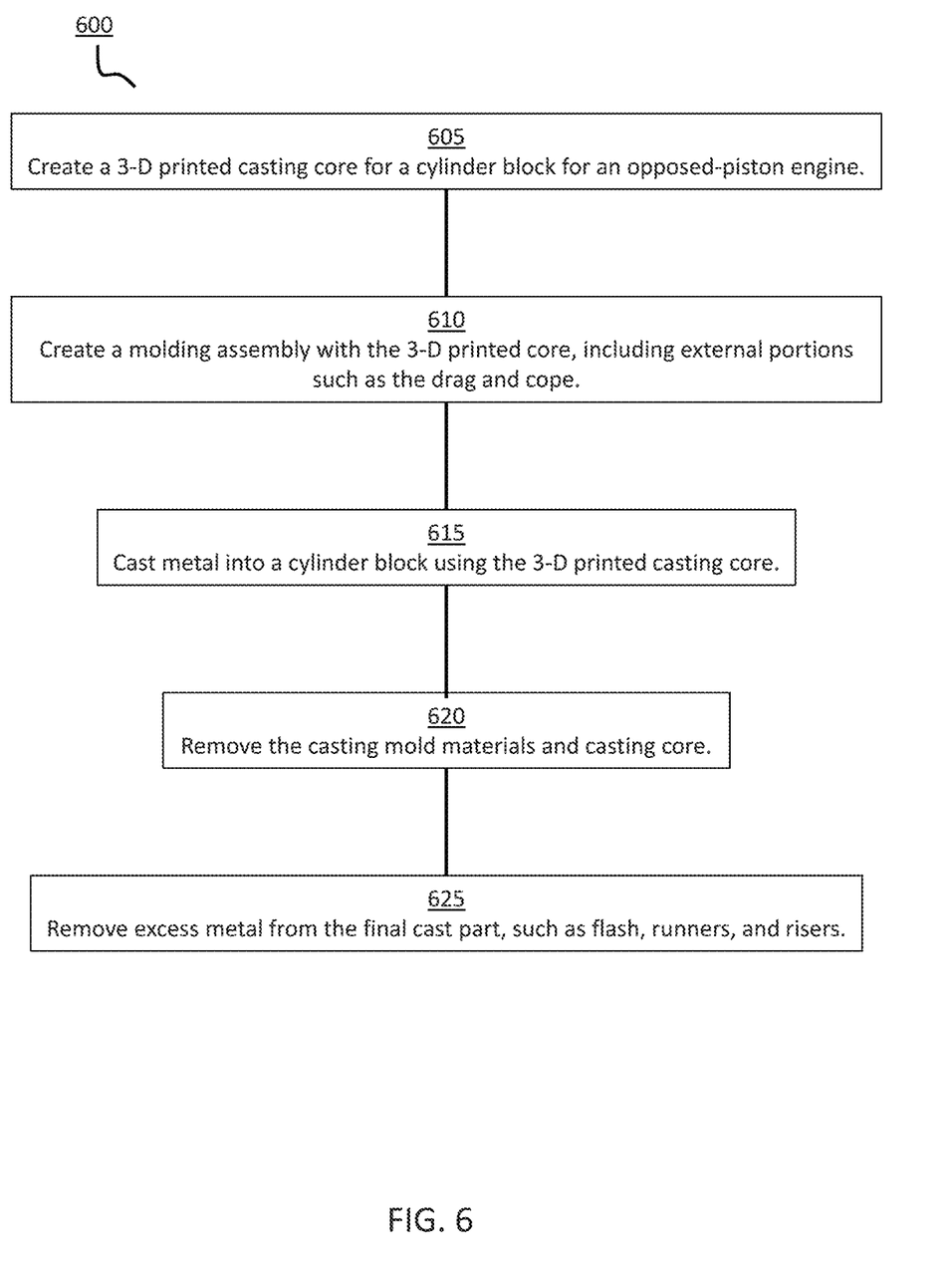
FIG. 6 shows a method for making a parent bore cylinder block or a parent bore engine block of an opposed-piston engine.

An exemplary method 600 for making a parent bore cylinder block for an opposed-piston engine is shown in FIG. 6. Initially in this method, a 3-D printed casting core for a parent bore cylinder block for an opposed-piston engine is created, as in 605. The casting core can be fabricated as described above, using 3-D printed sand, ceramic, or a combination of sand portions and ceramic portions for the casting core. The 3-D printed core can be assembled with cores for runners, risers, and gates, as well as a drag and cope to form a molding assembly, as in 610. Molten metal is poured into the molding assembly and cast into a parent bore cylinder block, as in 615. Once the metal parent bore cylinder block is ready, the casting core and other mold materials can be removed, as in 620. Removal of the casting core and other mold materials can include using a leaching solution to dissolve the ceramic material, as well as washing away sand core portions. Flash, runners, and risers can be machined off the final cast part following removal of the casting core and mold, as in 625.

Not seen or described herein are many other features that would be included in the parent bore cylinder block. Such features typically include, without limitation, various internal channels, borings, passageways, and so on for transporting fluids such as lubricant and coolant throughout the block itself. Such features are matters of design choice and are not part of this disclosure.

Manifestly, in instances where the cylinder block of an opposed-piston engine has cylinders that comprise liners or sleeves (i.e., a "linered" or "sleeved" cylinder block), a cylinder liner having the features shown in FIGS. 4A and 4B can be cast as a single metal piece from a mold that includes a 3-D printed casting core. A single-piece, or unitary, cylinder liner can be advantageous over liners that are fabricated from many pieces fitted together because of fewer junctions and connective parts needed (e.g., O-rings). In contrast to conventional casting techniques which may not be able to create the desired turbulators (e.g., turbulent flow creating features), creating a 3-D printed casting core, particularly a casting core that uses a ceramic in some portions, can allow for the needed feature size and texture.

Though parent bore cylinder blocks described herein above are described as having one or more cylinders, it should be appreciated that a parent bore cylinder block can be made for as few as one cylinder, as well as for two or more cylinders, preferably three cylinders. Further, in this disclosure, an engine block is a component of an engine that includes a parent bore cylinder block and can further include other components. Skilled practitioners will comprehend how descriptions of a parent bore cylinder block or methods pertaining to casting a parent bore cylinder block can also be applied to an engine block. Those skilled in the art will appreciate that the specific embodiments set forth in this specification are merely illustrative and that various modifications are possible and may be made therein without departing from the scope of this specification.

What is claimed is:

1. A parent bore cylinder block of an opposed-piston internal combustion engine, comprising:
    a cylinder in the parent bore cylinder block including a cylinder bore with a bore surface and a longitudinal axis;
    a combustion zone in an intermediate portion of the cylinder along the longitudinal axis of the cylinder bore; and
    a cooling jacket wall of the parent bore cylinder block surrounding the combustion zone on an outside portion of the cylinder, the cooling jacket wall enclosing cooling features;
    wherein the parent bore cylinder block is cast from a single type of metal or metal alloy.

2. The parent bore cylinder block of claim 1, further comprising longitudinally separated intake and exhaust ports of the cylinder each port comprising:
    an array of adjacent port openings in the parent bore cylinder block arranged along a respective circumference of the cylinder in a respective plenum of the engine; and
    a port bridge between each pair of adjacent port openings.

3. The parent bore cylinder block of claim 2, further comprising a cooling passage for conducting coolant through at least one port bridge of the exhaust port.

4. The parent bore cylinder block of any one of claims 1-3, wherein the parent bore cylinder block is made of a single metal casting.

5. The parent bore cylinder block of claim 4, wherein the port openings are cast features in the parent bore cylinder block.

6. The parent bore cylinder block of claim 1, wherein the cooling features comprise any of pegs, walls, ridges, ribs, and other protrusions from an outer wall of the cylinder that are configured to create a coolant flow path for cooling fluid.

7. The parent bore cylinder block of claim 6, wherein the cooling features include a spacing of about 5 mm.

8. The parent bore cylinder block of claim 1, wherein the cylinder bore comprises one or more machined features.

9. The parent bore cylinder block of claim 2, wherein the exhaust plenum is an exhaust gas plenum chamber into which all of the exhaust port openings open from the interior of the cylinder.

10. An opposed-piston engine, comprising:
    a parent bore cylinder block;
    the parent bore cylinder block comprising:
    at least one cylinder with a cylinder bore, a bore surface, and a longitudinal axis;
    a combustion zone in an intermediate portion of the at least one cylinder, along the longitudinal axis of the cylinder bore;
    a cooling jacket wall of the parent bore cylinder block surrounding the combustion zone on an outside portion of the cylinder, the cooling jacket wall enclosing a coolant flow path; and
    longitudinally separated intake and exhaust ports of the at least one cylinder, each port comprising an array of circumferentially-spaced adjacent port openings in the parent bore cylinder block from the cylinder bore to an intake plenum and to an exhaust plenum, respectively, and a port bridge between each pair of adjacent port openings;
    wherein the parent bore cylinder block is cast from a single type of metal or metal alloy.

11. The opposed-piston engine of claim 10, wherein each pair of opposed-pistons is configured to move across and open and close the ports, further wherein a combustion chamber is defined in the combustion zone between end surfaces of the pistons as the pistons approach respective top center locations.

* * * * *